A. E. NORRIS.
HOISTING APPARATUS.
APPLICATION FILED AUG. 23, 1906.

980,818.

Patented Jan. 3, 1911.
5 SHEETS—SHEET 1.

Witnesses:
Adolph C. Kaiser
Robert H. Kammler

Inventor:
Almon E. Norris
by Emery & Booth
Atty's

A. E. NORRIS.
HOISTING APPARATUS.
APPLICATION FILED AUG. 23, 1906.

980,818.

Patented Jan. 3, 1911.

5 SHEETS—SHEET 2.

Witnesses:
Adolph C. Kaiser
Robert H. Kammler

Inventor:
Almon E. Norris
by Emery Booth
Atty's

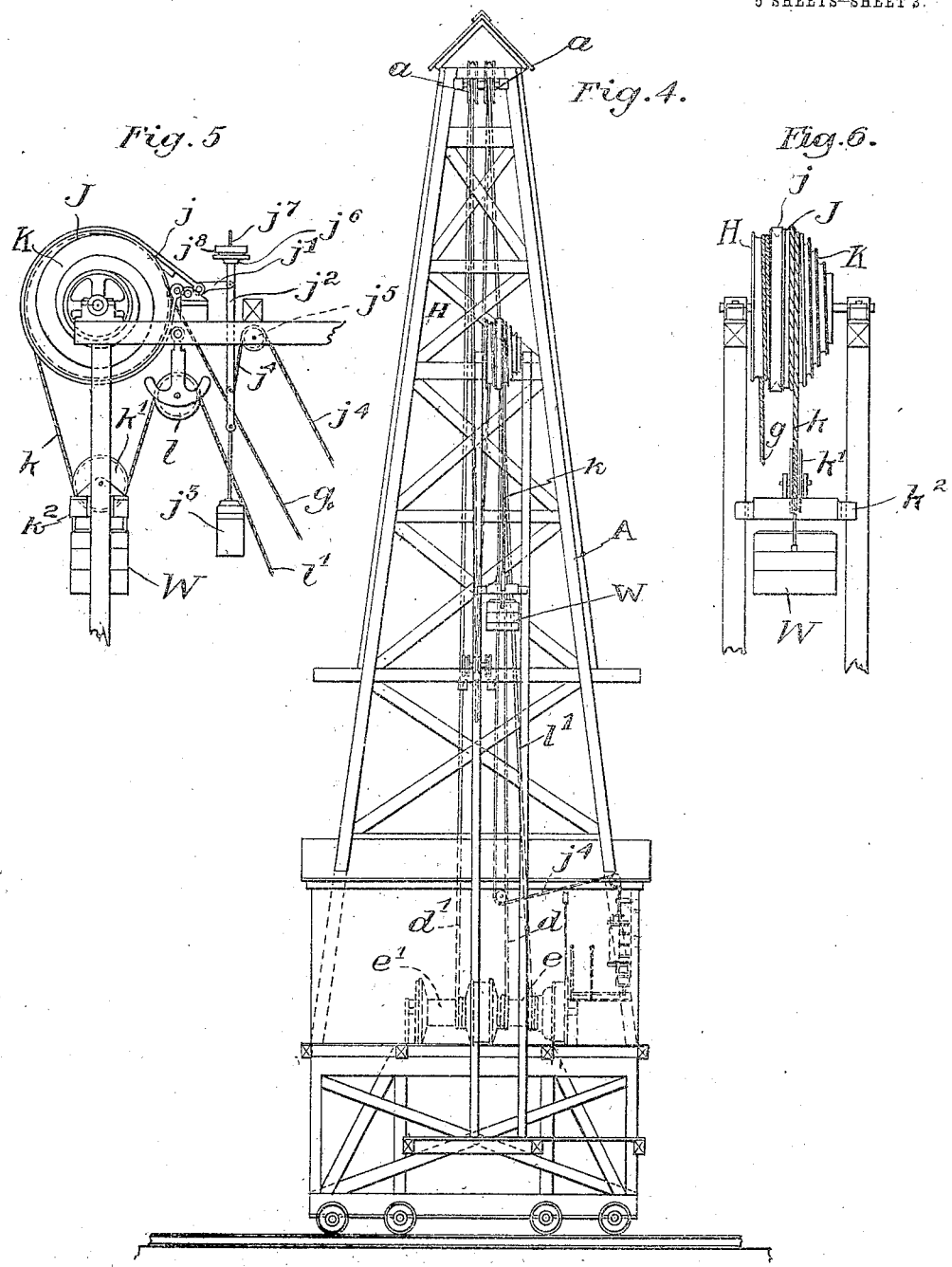

A. E. NORRIS.
HOISTING APPARATUS.
APPLICATION FILED AUG. 23, 1906.

980,818.

Patented Jan. 3, 1911.

5 SHEETS—SHEET 4.

Witnesses:
Adolph C. Kaiser.
Robert H. Kammler.

Inventor:
Almon E. Norris
by Emery Booth
Atty's

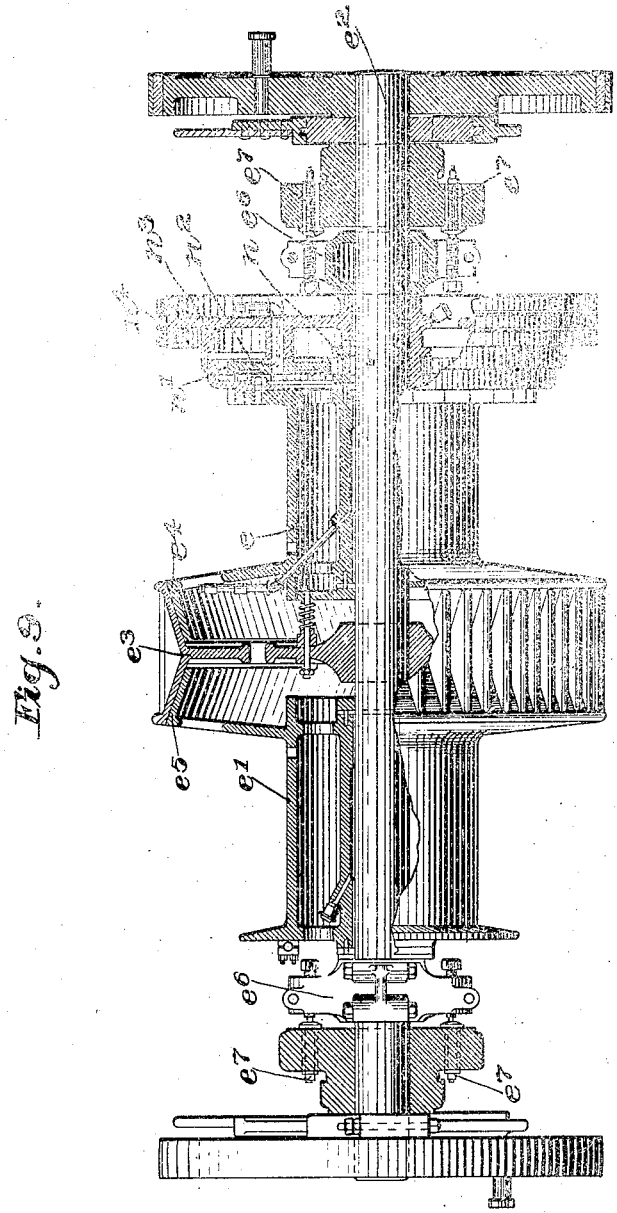

UNITED STATES PATENT OFFICE.

ALMON E. NORRIS, OF CAMBRIDGE, MASSACHUSETTS.

HOISTING APPARATUS.

980,818.   Specification of Letters Patent.   Patented Jan. 3, 1911.

Application filed August 23, 1906. Serial No. 331,682.

*To all whom it may concern:*

Be it known that I, ALMON E. NORRIS, a citizen of the United States, residing at Cambridge, in the county of Middlesex and State of Massachusetts, have invented an Improvement in Hoisting Apparatus, of which the following description, in connection with the accompanying drawings, is a specification, like letters on the drawings representing like parts.

My invention relates to hoisting apparatus and consists more particularly in improvements which add to the efficiency and economical operation, as well as facilitating the control of such apparatus.

My invention will be best understood by reference to the following description when taken in connection with the accompanying illustration showing one specific embodiment thereof, while its scope will be more particularly pointed out in the appended claims.

Figure 1:
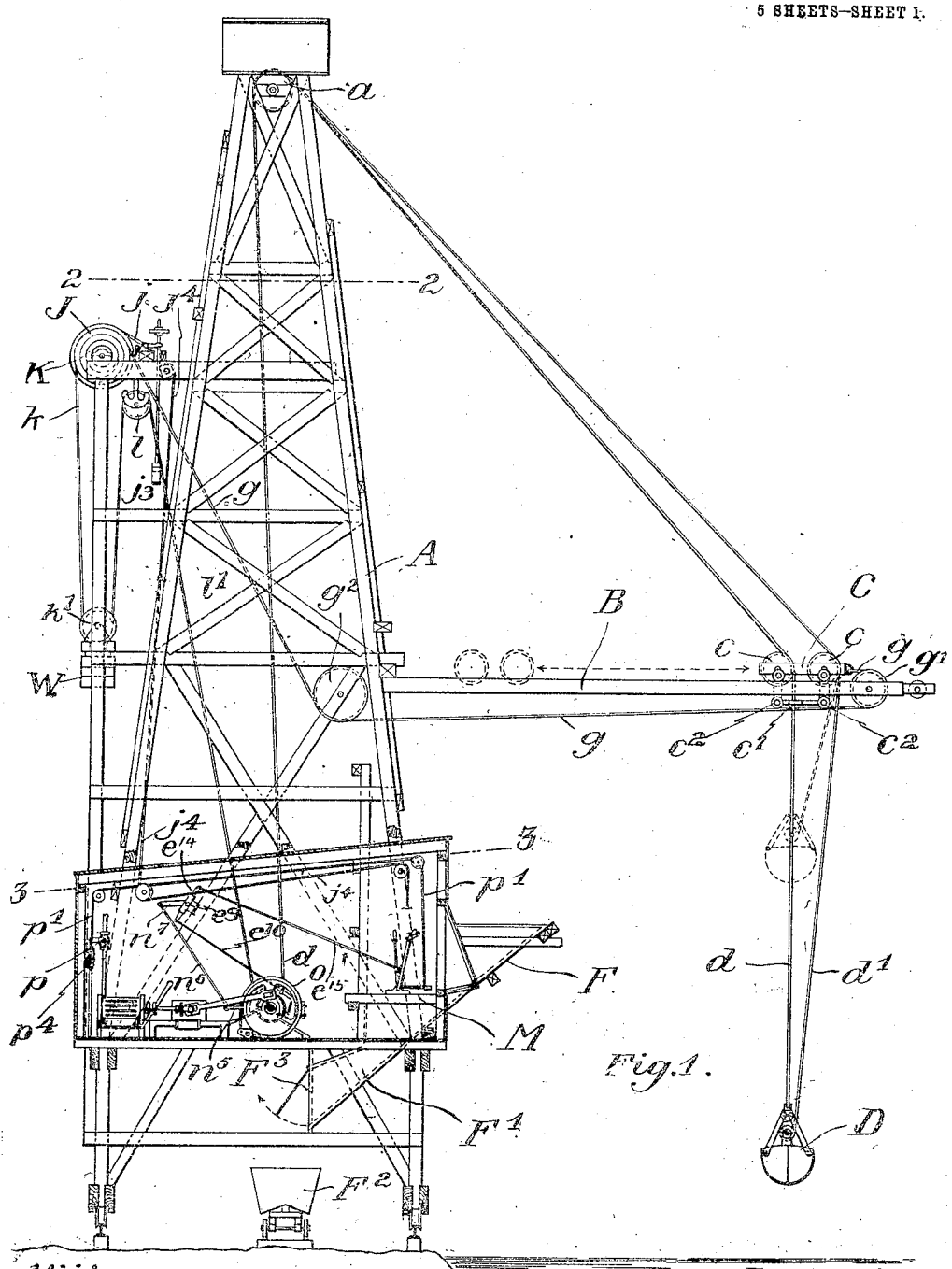
Figure 2:
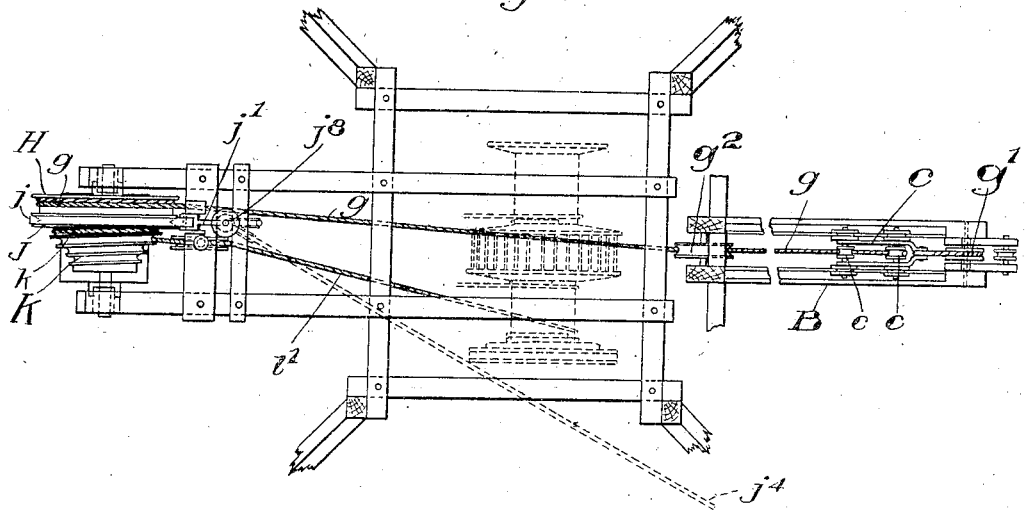
Figure 3:
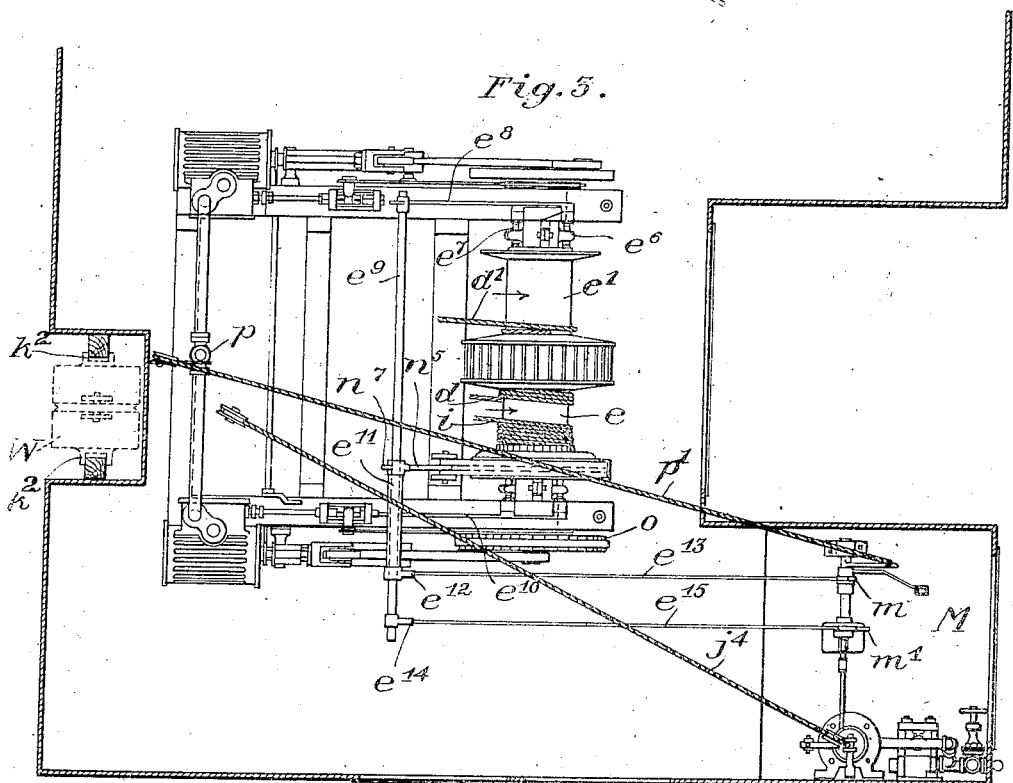
Figures 7, 8:
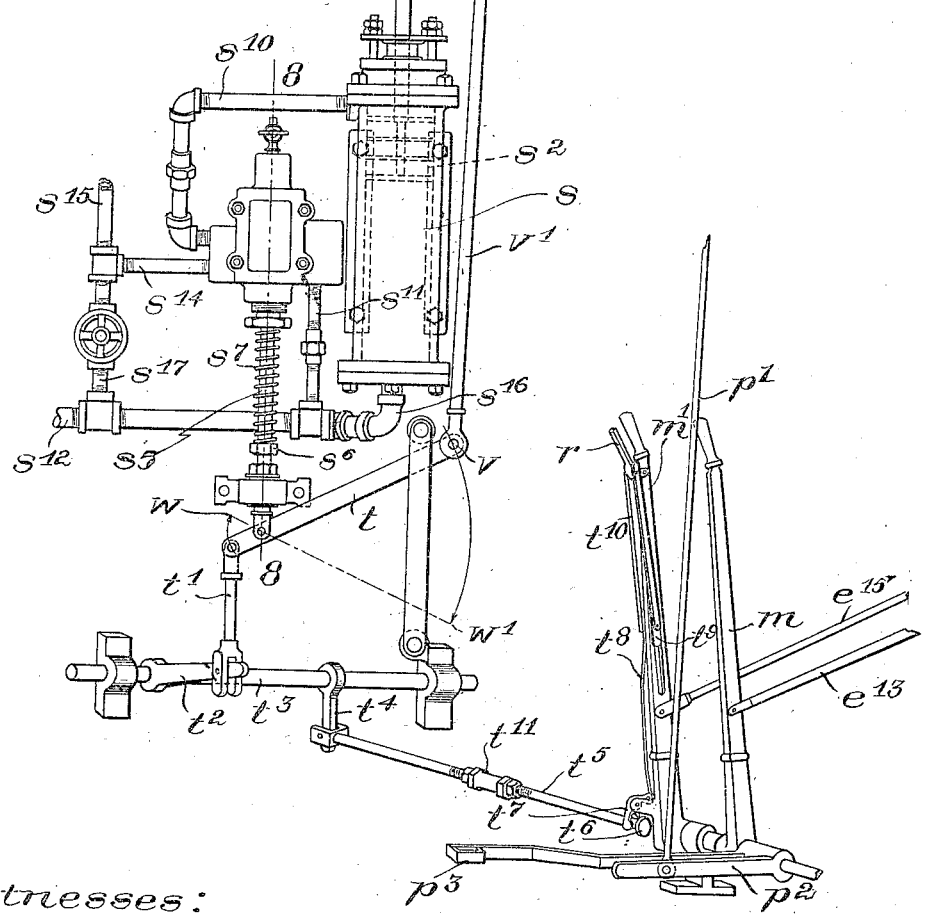

In the drawings,—Figure 1 shows in side elevation a hoisting tower embodying one form of my invention; Fig. 2 is a sectional plan, on an enlarged scale, and on the line 2—2, Fig. 1, of the traversing drum for the trolley and its connected parts; Fig. 3 is a plan view, also on an enlarged scale, and taken in section on the line 3—3, Fig. 1, showing the various controlling and operating devices in the tower; Fig. 4 is a rear elevation of the tower shown in Fig. 1; Fig. 5 is a side elevation, on an enlarged scale, of the traversing drum and the parts connected therewith; Fig. 6 is an end elevation of the same; Fig. 7 shows on an enlarged scale, partly in perspective, the controlling levers and the pressure control devices for the traversing drum; Fig. 8 is a section on the line 8—8, Fig. 7, showing the controlling valve for the pressure cylinder, and Fig. 9 is an elevation, partly in longitudinal section, of the rope-winding drums for the operating ropes.

Referring to the drawings, I have there illustrated my invention as applied to a hoisting tower A carrying the laterally extending boom B, which latter provides a track-way for the trolley carriage C, by which the hoisting element, herein represented by the grab or bucket D, is carried. While I have shown my invention as embodied in an apparatus of this type, *i. e.*, a tower hoist, and employing the instrumentalities which are herein specifically described, and, while this will sufficiently set forth the broad principles thereof for the understanding of those skilled in the art, it is to be understood that the application of this invention is not limited to this particular type of hoisting apparatus, or to a hoisting apparatus employing the elements which are here alone set forth, but that numerous other applications and embodiments of the herein described invention may be had.

Referring to the specific details of the illustrated apparatus, the bucket D, which may be of any suitable or usual construction, such for example as that set forth in U. S. Patent No. 699,000, dated April 29, 1902, is provided with one or more operating ropes by which the raising and lowering of the bucket and the opening and closing of the bucket jaws may be controlled. In the present instance the operating ropes are two in number and comprise the hoisting rope $d$ by which the bucket is suspended and raised or lowered and the opening and closing rope $d'$ by which the jaws are opened or closed. These ropes both pass upward over and about suitable guide sheaves $c$ upon the trolley, thence obliquely upward over the guide sheaves $a$ near the top of the tower A, and thence downward to the operating room near the base of the tower, where they pass over and about and are secured to suitable rope-winding drums $e$ and $e'$, the former, or the hoisting drum, serving to control the hoisting rope $d$ and the latter, or the opening and closing drum, serving to control the opening and closing rope $d'$.

During the operation of the hoisting apparatus the material to be hoisted is raised from a position, for example, beneath the end of the boom approximately where the bucket is shown in Fig. 1, and deposited in the hopper F at the side of the tower, whence it is discharged through the chute F' into cars $F^2$ or other like receptacles, which latter for this purpose may be caused to travel upon a suitable track-way through the base of the tower and beneath the gate $F^3$ of the chute. This requires not only the opening and closing movement, as well as the lifting movement of the bucket to be more fully referred to, but the traversing movement of the trolley C as well. In the present instance this traversing movement is effected with great ease of control, rapidity of action and marked economy in the necessary fuel and power consumed through the provision of certain features of this invention, the specific embodiment of which in the illustrated form of apparatus will be more particularly referred to.

Referring to Fig. 1 it will be obvious that through the oblique upward pull of the bucket-operating ropes as they pass obliquely down from the overhead sheaves $a$ to the trolley sheaves there is exerted upon the trolley carriage a horizontal pull, or component of pull, which tends constantly to return the trolley and bucket from the outer or loaded position at the extremity of the boom to its inner or discharge position, such for example as is represented by dotted lines in Fig. 1. This pull, it will be observed, is greater when the operating ropes sustain the weight of the loaded bucket and less when they sustain the weight of the empty or discharged bucket. To oppose this inward pull upon the trolley there is provided a traversing rope $g$ attached to the outer end of the trolley carriage. This rope passes about a sheave $g'$ stationarily journaled near the end of the boom, thence in a reverse direction toward the tower and about a guiding sheave $g^2$ mounted thereon, and thence obliquely upward, over and about a suitable rope-winding element herein comprising the trolley traversing drum H horizontally journaled upon a framework extending laterally from the tower. The end of the traversing rope $g$ is secured to the drum H and when wound upon the latter causes the outward travel of the trolley. When unwound from the drum the inward travel of the trolley follows through the pull of the weighted grab upon the operating ropes.

At the side of the drum and fixedly secured thereto is the braking drum J encircled by a band brake $j$, through the control of which, as will more fully appear, the traversing drum may be held fixed to hold the trolley in a given position, or released to permit its travel in either direction at a controlled rate of speed. At the side of the brake J and fixedly attached also to the traversing drum is a second rope-winding element K which herein is in the form of a spiral scroll, about which is wound or partially wound the counter-weight rope $k$, which passes downwardly (Figs. 1, 5 and 6) and carries suspended in a depending loop the sheave $k'$, the latter sustaining the main counter-weight W. The counter-weight is suspended from and the sheave $k'$ supported on the sliding frame $k^2$, which (Figs. 5 and 6) is provided with flanged guiding members to engage with a portion of the frame-work of the tower and thereby receive guidance for a vertical movement of considerable range.

The counter-weight rope is so connected to and wound about the overhead scroll K that when the brake $j$ is released, it tends to turn the scroll and the attached traversing drum to wind up the traversing rope and cause outward travel of the carriage. It is preferably of sufficiently great mass to somewhat more than overcome the opposite, horizontal pull of the bucket upon the trolley when the bucket is empty, but insufficient to overcome that pull when the bucket is loaded, so that the brake being released the empty bucket tends automatically to run out and the loaded bucket automatically to run in. It will be apparent, however, that the opposing pull exerted upon the trolley by the inclined operating ropes varies according to the angular inclination of the ropes and this according to the position of the trolley, being greatest when the trolley is at its extreme outward position and less when the trolley is at its extreme inward position. In order that the outward pull exerted by the counter-weight should bear a like proportion at all times to the inward pull exerted by the operating ropes, whatever may be the inclination of the latter, the pitch diameter of the scroll K is varied accordingly so that the counter-weight rope passes off from the scroll at its greatest pitch diameter in the extreme outward position of the trolley (as shown in Fig. 1), and at its smallest, or a greatly decreased pitch diameter, in the extreme inward position of the trolley, thus giving a scroll diameter or leverage which decreases as the trolley moves inward, and causing the counter-weight to exercise a traversing pull upon the trolley, which varies with and in proportion to the variation in the opposite pull exercised by the traversing ropes. In other words, the scroll is so designed as to provide means for varying the counter-weight pull upon the traversing rope and upon the trolley in accordance at all times with the opposing pull of the operating ropes as such pull varies with different positions of the trolley carriage.

To operate the band brake $j$ the latter is provided (Figs. 2 and 5) with a pivoted operating lever $j'$, to opposite sides of the fulcrum of which are attached the opposite ends of the brake band $j$, so that the lowering of the free end of the operating lever clasps the band about the brake drum, while its elevation releases the brake drum. For the control of the brake-operating lever the latter is connected to a shackle frame $j^2$, which latter sustains at its lower end the brake weight $j^3$, tending to lower the free end of the brake lever and maintain the brake applied. Connected, however, to the shackle frame is the controlling and weight lifting rope $j^4$, which passes up and over a guide sheave $j^5$ upon the frame-work of the tower, and thence downward to the operating room, where it is connected to suitable controlling devices whereby the brake weight may be either lifted or lowered and the brake applied or released as desired. While the brake weight $j^3$ may be added to or varied as desired, in order to make the weight quickly adjustable, the upper part of the shackle frame $j^2$ is provided with a rest $j^6$ from which projects a pin $j^7$ adapted to receive any number of additional weights $j^8$. The weights $j^8$ being readily accessible can be easily added to or withdrawn for delicate adjustment.

The traversing movement of the trolley carriage will now be readily understood from the construction described. In its outer position, as shown in Fig. 1, assuming the trolley to sustain the loaded bucket, it is prevented from running in by the application of the brake to the traversing drum which prevents the unwinding of the traversing rope $g$. After the bucket has been loaded and partly raised by the winding in of the operating ropes $d$ and $d'$, the operator releases the brake through movement of the brake-operating rope $j^4$ permitting the trolley then to run in under the inward pull of the operating ropes, which, with the loaded bucket, slightly overbalances the pull of the counter-weight. The operator having control of the brake at all times may control the running-in speed of the trolley and accurately position it, so that when the bucket, which has been hoisted as well as traversed, is over the hopper F, the opening and closing rope is slackened to discharge its load. The moment the load is discharged, the brake being still released, and the outward pull of the counter-weight being now superior to the inward pull of the operating ropes upon the empty bucket, the trolley is instantly reversed and starts to run out. The operating ropes being simultaneously slackened, the bucket is lowered at the same time and reaches the position indicated in Fig. 1, where the trolley is then held by continued application of the brake until the loaded bucket is next to be raised and traversed. It will be seen that this mode of traversing the trolley carriage not only provides an effective control for the traversing movement, but reduces to a minimum the power which is required for the trolley movement and eliminates much of the usual traversing machinery. The bucket, executing as it does a combined movement through an inclined or curved path, is quickly transferred from its loading to its discharging position and the discharge may be instantly followed by the return of the trolley to its outer position.

In order to relieve the hoisting engine of the full weight of the bucket during hoisting I have also counter-weighted the bucket D. While this might be effected by a counter-weight separate from the counter-weight W, in the present instance I dispense with a separate counter-weight and render the counter-weight W effective both for counter-weighting the trolley and counter-weighting the bucket. To this end the counter-weight rope $k$ after passing down about the counter-weight sheave $k'$ passes thence up and over the guide sheave $l$ suspended from the frame-work of the tower. It thence continues through the strand designated $l'$ downward to the operating room and the hoisting drum $e$ therein. To the drum it is securely fastened but is oppositely wound thereon from the hoisting rope $d$, so that as the latter winds upon the drum the hoist-counter-weight rope $l'$ unwinds. The counter-weight, preferably, not quite balances the weight of the unloaded bucket so that as the bucket is raised, the hoisting drum has to elevate only the excess weight of the bucket together with the load carried thereby.

The excess weight of the bucket over the pull of the counter-weight while sufficient to cause the rapid descent of the unloaded bucket may be insufficient to cause the bucket effectively to sink into the coal or other material which is being conveyed and which, for the purposes of the description, may be assumed to be coal. Since it is desirable to have the full weight of the bucket available to cause the bucket jaws to sink into the coal, I have provided means for relieving the bucket counter-weight pull when the bucket strikes the coal, such means in the described embodiment of my invention consisting in the provision of such means at the rope-winding drums $e$, $e'$ that while these drums may be separately clutched and unclutched from the engine, the movement of the hoisting drum $e$ may be reversed and preferably at a slower speed to positively raise the counter-weight and slack the hoisting rope.

Referring more particularly to the hoisting apparatus (Figs. 1, 3 and 9) the hoisting drum $e$ and the opening and closing drum $e'$ are journaled side by side upon the main driving shaft $e^2$ having a slight endwise movement thereon. A suitable friction clutch $e^3$ is fixedly secured to the shaft $e^2$ between the two drums, and the drums are provided with clutch surfaces $e^4$ and $e^5$ to coöperate with said clutch device, whereby either drum may be clutched to the shaft $e^2$. Any suitable clutch operating device may be employed and I have herein indicated sliding collars $e^6$ and clutch operating screws $e^7$ of the type described in my prior Patent Reissue No. 12,085 for forcing the drums either separately or together into clutching engagement with the shaft. For this purpose the clutch screws for the drum $e'$ are connected (Figs. 1 and 3) through suitable connections to the operating rod $e^8$ which is connected to be advanced or retracted by the turning of the overhead operating shaft $e^9$, and the clutch operating screws for the drum $c$ are connected to the rod $e^{10}$, which latter is connected to be moved through the operating sleeve $e^{11}$ journaled for independent movement upon the operating shaft $e^9$. The clutch operating sleeve $e^{11}$ carries the upright arm $e^{12}$, to which is attached the link connection $e^{13}$, the latter extending to the operating platform M (Figs. 1 and 3) at one corner of the operating tower, where it is attached to the hand lever $m$ (Figs. 3 and 7). The clutch-operating shaft similarly has connection through the upright arm $e^{14}$ and the connecting link $e^{15}$ with the hand lever $m'$ at the operating platform. The hand levers $m$ and $m'$ are pivotally mounted side by side so that the operator through their manipulation can readily control the clutching or unclutching of the rope-winding drum.

In addition to the direct driving connection described, the hoisting drum $e$ when unclutched may be driven in a reverse direction and at a slower rate of speed by means of planetary gearing, herein comprising the driving pinion $n$ keyed or otherwise secured to the shaft $e^2$, the internal gear $n'$ attached to or comprising a part of the said hoisting drum $e$, and the intermediate pinion $n^2$ carried by and journaled upon the rotatable member $n^3$, the latter mounted for free rotation about the shaft $e^2$ excepting when held or opposed by the three-part brake band $n^4$. Thus when it is desired to reverse the movement of the hoisting drum, the same is unclutched and the band $n^4$ tightened to hold fast the rotatable member $n^3$, whereupon the drum is reversely driven at a slower rate of speed through the pinion $n$, intermediate gear $n^2$ and internal gear $n'$.

The brake band $n^4$ is connected to a brake operating lever $n^5$ (Figs. 1 and 3), the latter having a connection $n^6$ to the arm $n$ attached to the operating sleeve $e^{11}$, the connections being such that when the lever $m$ is thrown to unclutch the drum, the brake band $n^4$ is simultaneously tightened to throw in the slow reverse speed, but when moved to clutch the drum to the driving shaft, the brake band is relaxed to permit rotation of the member $n^3$ and discontinue the slow speed.

The main driving shaft which may be driven in any suitable way is provided with an automatic brake or load-holding device $o$ of any usual or ordinary construction such as that described in my Reissue Patent No. 12,040 preventing reverse rotation of the shaft. In the illustrated embodiment of the invention the shaft is driven from the two-cylinder horizontal engine shown, which latter may be of any ordinary or suitable construction. The engine is controlled through the throttle valve $p$, the arm or lever for which is connected to the throttle controlling rope $p'$. This passes vertically upward, thence over and about suitable sheaves down to the operator's platform, where it is connected to the lever arm $p^2$, the latter secured to the foot lever $p^3$ arranged by the side of the clutch lever $m$, so that the operator while manipulating the clutch levers may at any time move the foot lever to vary the throttle, the latter being returned to a closed position by the spring $p^4$ underlying the throttle lever.

Since the weight $j^3$ used to apply the brake band to the traversing drum with the necessary pull is of considerable size, it becomes desirable to introduce auxiliary controlling devices between the operator and the brake, so that the operator by a slight movement or effort, can readily effect the raising or lowering of this weight, or the partial raising or lowering thereof, and this without interference with, and irrespective of, the careful control which he must constantly maintain over the hand levers $m$ and $m'$ during the hoisting operation. The brake-controlling lever, which herein comprises merely the hand grip $r$, pivoted (Fig. 7) adjacent the handle of the clutch lever $m'$ controls the power-actuated controlling devices, the latter acting directly to raise or lower the brake weight. Referring to Fig. 7, the brake-operating rope $j^4$ leads to the operating platform, where it is connected to the piston-rod $s'$ of the pressure cylinder $s$.

Admission of steam or other fluid pressure to the upper end of the cylinder causes depression of the piston $s^2$ attached to the piston-rod $s'$ and raises the brake weight $j^3$, while the exhaust of said pressure lowers said weight and again applies the brake.

The admission of pressure to the cylinder $s$ or exhaust therefrom is controlled by the D-valve $s^3$ working in the valve chamber $s^4$ at the side of the cylinder. The valve is secured to a valve rod $s^5$ which passes through a suitable stuffing box and is provided near its lower end (Fig. 7) with an adjustable collar $s^6$, between which and the stuffing-box there is provided a compression spring $s^7$ tending to maintain the valve in its depressed or inoperative position, which is that shown in Fig. 8. In this position the cylinder port $s^8$ (Fig. 8) is connected with the exhaust port $s^9$, rendering the apparatus inoperative to move the brake. The cylinder port is connected by the pipe $s^{10}$ (Fig. 7) with the upper end of the steam cylinder and the exhaust port $s^9$ is connected through the pipe $s^{11}$ with the exhaust pipe $s^{12}$. When the valve is pressed up, however, by elevation of its stem, the cylinder port $s^8$ is placed in communication with the pressure port $s^{13}$, the latter connected through the pipe $s^{14}$ with the live pressure pipe $s^{15}$, so that under those conditions steam is admitted to the cylinder to depress the piston.

To effect movement of the valve stem through the handle grip $r$, the valve stem is connected at its lower end to the link $t$, one end of which is jointed to the connection $t'$, the latter pivotally connected to the lateral arm $t^2$ on the rock shaft $t^3$. The rock shaft is also provided with a depending arm $t^4$ connected to the underlying rod $t^5$, so that longitudinal movement of the latter turns the rock shaft and thereby through the connecting links $t$, $t'$ and $t^2$ elevates the valve stem.

The inner end of the rod $t^5$ is provided with a cylindrical head $t^6$ which is opposed by a forked finger $t^7$ embracing the rod. This finger constitutes one arm of a bell crank lever, the opposite arm of which is connected to the depending link $t^8$. The latter is attached to a slide $t^9$ having linked connection $t^{10}$ with a handle grip $r$, whereby the gripping movement of the latter draws the forked finger over against the head $t^6$ of the rod, effecting movement of the latter and of the valve.

The rod $t^5$ being substantially co-axial with the pivotal support of the handle $m'$, the handle grip may be moved to control the valve without reference to the position of the clutch lever, the control of the clutch exercised by the hand lever and the control of the brake exercised by the hand grip being therefore entirely independent of each other. The rod $t^5$ is provided with a turn buckle $t^{11}$, or other suitable means, whereby the connections between the regulating valve and the hand grip may be adjusted.

In order to bring the piston $s^2$ to rest at any predetermined position and therefore to cause not only the bare application or release of the brake, but its application with a pressure varying in accordance with the extent of movement of the hand grip $r$, I have provided means for bringing the piston to rest when it is moved an amount proportional to the movement of the hand grip. For this purpose the link $t$ has a fulcrum $v$ upon the depending rod $v'$ the upper end of the latter being jointed to the horizontal arm $v^2$ attached to and extending laterally from the piston-rod $s'$. When the hand grip is moved to lower the valve rod, the fulcrum $v$ being fixed, the valve rod is moved as heretofore described. This is followed by admission of steam to the cylinder and the depression of the piston together with the connecting rod $v'$. This lowers the fulcrum $v$, causing the link to swing down about its pivotal connection to the link $t'$, which then constitutes the fixed fulcrum for the link $t$. This gradually draws down the valve rod until the valve is closed, cutting off further admission of pressure to the cylinder.

The proportions are such that if the hand grip be given its full movement to raise the link $t'$ to the point $w$, the valve being then full open, the piston will move to its extreme limit before closing the valve, the fulcrum point $v$ then passing to the point $w'$. If the hand grip is given but a partial movement, the piston will move a corresponding proportion of its full amount before closing the valve. In this fashion the operator, by the mere pressure of his hand, is enabled to slacken the pull upon the brake band $j$ to any desired extent, so that he can exercise an extremely delicate control of the speed at which the trolley runs in or out.

It will be obvious that, if, for any reason, the piston tends to move from that position assigned by the hand grip, such movement tends again to open the valve and return the piston to its assigned position.

The lower part of the cylinder is connected by the pipe $s^{16}$ with the exhaust and there is also provided a connection $s^{17}$ between the exhaust and the pipe $s^{14}$, normally closed, however, by a gate valve.

The trolley carriage C carries an underlying framework $c'$ (Fig. 1) with which the bucket engages if lifted too high and is thus prevented from excess lifting movement. To prevent the trolley from being lifted above the boom by excess lifting movement of the bucket, the underlying frame-work $c'$ preferably carries the trolley wheels $c^2$ engaging with the under part of the boom.

The operation of the entire apparatus will be readily understood from the preceding description. Assuming the loaded bucket to be in the position represented in Fig. 1 with the jaws closed, the operator moves both hand levers $m$ and $m'$ to throw in the hoisting drum clutch and the opening and closing drum clutch respectively. This winds in at the high speed both the opening and closing and the hoisting ropes and hoists the loaded grab. When partly hoisted the operator presses the hand grip $r$, causing the brake band $j$ to relax and allowing the trolley to run in at a speed which he has at all times under certain control. The loaded bucket therefore moves simultaneously upward and inward until positioned over the hopper F. The operator then simultaneously releases the foot treadle $v^3$ to close the throttle and stop the engine and reverses the hand lever $m'$ to unclutch the opening and closing drum and slack the opening and closing rope, this causing the opening of the jaws and dumping of the load. Preferably at the same time, the hand lever $m$ is moved to release the hoisting drum $e$, by unclutching or partly unclutching the same, this permitting the bucket to descend and the trolley to run out under the action of the trolley counter-weight W at the instant the load is dumped. The trolley running out to the end of the boom, the operator there positions it by releasing the hand grip $r$, the bucket or grab having in the meantime dropped upon the underlying coal. As soon as the bucket strikes the coal, the operator opens the throttle and starts the engine by depressing the foot lever $p^3$. The reverse gear is then thrown in by a further reverse movement of the hand lever $m$, which completely unclutches the hoisting drum, and the latter is now reversely rotated at the slower speed and the counter-weight is raised, letting out slack in the hoisting rope. The operator can readily control the amount of slack by the clutch lever $m$. At the same time, the clutch lever $m'$ is thrown to clutch the opening and closing drum and take in slack in the opening and closing rope at the greater speed, so that by the time the sunken bucket has closed its jaws about the coal, the bucket is ready to be hoisted. When this occurs, the hoisting clutch lever $m$ is reversed, which starts both drums winding in the operating ropes to hoist the closed bucket as before.

It will be seen that not only is the hoisting apparatus above described operated with marked economy and ease, but that the control of the entire hoisting operation, including the hoisting and opening and closing of the bucket and the traversing of the trolley carriage requires but a single operator. In fact, the entire control of the hoisting and traversing operation may be managed through movement of the pair of hand levers and the foot lever shown in Fig. 7.

It will be observed that the auxiliary grasping device, herein in the form of the hand grip or lever $r$, is pivotally mounted upon the bucket controlling clutch lever $m'$ so that, while the hand grip is within the grasp of the hand moving the lever $m'$, the latter and the hand grip $r$ have each a working movement independent of the working movement of the other.

While this mode of operation and control represents a simplified and preferred procedure, it will be readily understood that other methods of operating the apparatus and other instrumentalities may be used without departing from the spirit of the invention.

It will be understood that while I have shown this invention as applied to a tower operated by a steam engine, its application is not limited in its useful employment to this motive power, it being in fact of particular value in conjunction with an electrically operated hoisting apparatus. It will also be understood that while I have here described one form and embodiment of my invention for the purpose of illustrating the same, the same is susceptible of numerous modifications both as to form, construction and relative arrangement of parts, as well as to the application here made of the broad and general principles set forth.

Claims.

1. A hoisting apparatus having a tower, a boom extending laterally therefrom, a trolley adapted to travel along the boom, a bucket suspended from the trolley, bucket operating ropes, including an opening and closing rope and a hoisting rope, passing upward over suitable guide sheaves on the trolley, thence upward and over guide sheaves on the tower, and thence downward, rope-winding means upon said tower with which said ropes are connected for winding and unwinding the same and controlling the hoisting and the opening and closing movement of the bucket, a traversing cable having one end connected to the trolley to draw the latter toward the end of the boom, a traversing drum to which the opposite end of the cable is connected, a scroll connected to the traversing drum, a counter-weight rope with its attached counter-weight connected to said scroll in such relation as to cause the winding in of said traversing rope, said counter-weight and said scroll being proportioned to exert at all times and irrespective of the angular inclination of the operating ropes a pull upon the traversing rope less than the opposing horizontal pull of the said operating ropes upon the trolley when carrying the loaded bucket, but greater than said horizontal pull when carrying the unloaded bucket, a band brake provided with a weighted operating lever for holding said traversing drum against movement, a pressure operated device for raising said weight and releasing said drum, and manual means for controlling said pressure operated device, whereby the loaded bucket may be made automatically to run in and the unloaded bucket automatically to run out on said boom.

2. A hoisting apparatus comprising a tower, a boom extending laterally therefrom, a trolley adapted to travel along the same, a bucket provided with operating ropes leading upward to the trolley and passing thence obliquely to the tower, rope winding means for controlling said operating ropes, a traversing cable connected to draw said trolley outward on the boom against the inward pull of the operating ropes, a traversing drum to which the opposite end of said traversing cable is connected, a scroll of varying diameter connected to the drum, a counter-weighted rope with attached counter-weight connected to the scroll to wind in said traversing cable about said drum, said counter-weight being sufficient to overcome the opposing lateral pull of the operating ropes upon the unloaded bucket but insufficient to overcome the pull of said ropes upon the loaded bucket, and said scroll being constructed to vary the counter-weight pull upon the trolley with the varying inclination of the operating ropes, a brake to hold said traversing drum, and means for controlling the application or release of said brake.

3. A hoisting apparatus having a trolley, a hoisting element such as a bucket sustained thereby, one or more operating ropes leading from the bucket to the trolley and thence to suitable hoisting apparatus but exerting a pull upon the trolley in one direction, a traversing rope connected to pull the trolley in the opposite direction, a rope-winding drum connected to control said traversing rope, a brake connected to hold or release said rope-winding drum, a weighted operating lever for holding said brake applied, a pressure operated device for raising said weight and releasing the brake, and means for controlling said pressure-operated device.

4. A hoisting apparatus having a tower, a boom, a trolley thereon, a traversing cable, a rope-winding drum for said traversing cable, a counter-weight connected to cause the winding in of said drum, a brake automatically and normally applied to said drum for restraining the movement thereof and means for releasing the brake at will.

5. A hoisting apparatus having a trolley, a track-way along which the same is adapted to travel, a traversing rope, a rope-winding drum for said traversing rope, a scroll of varying diameter connected to said drum, and a counter-weighted rope connected to said scroll to be wound upon or unwound from the same whereby the same is caused to exert a varying pull upon the traversing rope.

6. A hoisting apparatus having a trolley, a trackway along which the same is adapted to travel, a traversing rope, a winding drum for said traversing rope, a scroll of varying diameter connected to the winding drum, a counter-weighting rope connected to be wound upon or unwound from said scroll and acting thereby to exert a varying pull upon said traversing rope, braking means for holding said drum, and means for controlling said braking means.

7. A hoisting apparatus having a tower, a boom extending laterally therefrom, a trolley adapted to travel along the same, a bucket suspended from the trolley, bucket operating ropes comprising an opening and closing rope and a hoisting rope passing upward over suitable guide sheaves on the trolley, thence upward over suitable guide sheaves on the tower, and thence downward, rope-winding drums for said operating ropes, means for turning said rope-winding drums in the same direction at the same speed, or for reversing the movement of the hoisting drum at a slower speed, a traversing rope connected to the trolley carriage for drawing the latter toward the end of the boom, a traversing drum to which the opposite end of said rope is connected, a scroll connected to the traversing drum, a counter-weight rope having one end connected to the scroll and the opposite end to the aforesaid hoisting drum but reversely arranged thereon relatively to the hoisting rope whereby the one winds on as the other winds off, a counter-weight sustained in an appropriate loop of said counter-weight rope, said counter-weight exerting an opposing pull upon the hoisting rope somewhat less than that of the unloaded bucket and also irrespective of the position of the trolley, exerting a pull upon the traversing rope greater than the opposing pull of the operating ropes with the unloaded bucket but less than the opposing pull with the loaded bucket, a brake for controlling said traversing drum, and means for controlling said brake.

8. A hoisting apparatus comprising a tower, a trackway having a trolley thereon, a bucket suspended from the trolley, an opening and closing rope and a hoisting rope extending upward from the bucket to the trolley and thence laterally to the tower, rope-winding drums for said tower adapted to wind in said ropes simultaneously at the same speed or to wind in the opening and closing rope while letting out the hoisting rope at a relatively slow speed, a traversing rope connected to the trolley to draw the same against the opposing pull of the operating ropes, a traversing drum for winding in said traversing rope, means for counter-weighting said traversing drum to cause the traversing rope to pull upon said trolley with a force sufficient to cause the traversing of the same in one direction with the unloaded bucket but insufficient to overcome the pull of the operating ropes in the opposite direction with the loaded bucket, and means for counter-weighting the hoisting rope to offset a portion of the weight of the bucket during hoisting, said means permitting the positive raising of the counter-weight when the hoisting rope is slackened.

9. An apparatus of the class described having a trolley, a bucket, counter-weighting means for the trolley to assist in its traverse, and counter-weighting means for the bucket to offset a portion of the weight thereof during hoisting.

10. An apparatus of the class described having a trolley and a bucket suspended thereon, and a common counter-weight connected both to the bucket and the trolley.

11. An apparatus of the class described having a trolley, a bucket, an opening and closing and a hoisting rope, means for counter-weighting the bucket, means to relieve the same of the effect of said counter-weighting means, counter-weighting means for the trolley and common motive means for moving said bucket and trolley counter-weighting means.

12. In an apparatus of the class described, the combination with a trolley, a hoisting device thereon, counter-weighting means connected to said hoisting device, means positively to relieve said hoisting device of the full effect of said counter-weighting means, counter-weighting means also connected to the trolley and common motive means for moving both the counter-weighting means for said hoisting device and for said trolley.

13. In an apparatus of the class described, the combination with a trolley, a hoisting device, an operating rope leading thereto, a hoisting rope, means for counter-weighting said hoisting device, means for relieving the counter-weighting effect thereof while taking in said operating rope, means for counter-weighting the trolley and common motive means for moving both the counter-weighting means for said hoisting device and for said trolley.

14. In an apparatus of the class described, the combination with a trolley, counter-weighting means therefor, a hoisting device, counterweighting means for said hoisting device, a common motor for moving both said counterweighting means, an operating rope, and means for letting out slack in the hoisting rope while taking in the operating rope.

15. In an apparatus of the class described, the combination with a trolley, a hoisting element sustained thereby, counterweighting means therefor, operating ropes leading from said hoisting element to said trolley and thence laterally to suitable rope-winding mechanism, a trolley traversing rope connected to exert an opposing pull upon the trolley having a constant ratio to the pull of the operating ropes, counterweighting means for said trolley traversing rope and common motive means for moving both said counterweighting means.

16. In an apparatus of the class described, the combination with a trolley, a counter-weighted bucket, means for relieving the bucket of the counter-weighting effect, counter-weighting means for the trolley adapted to cause the latter automatically to run in one direction with the loaded bucket and in the opposite direction with the unloaded bucket, and common motive means for said bucket and said counterweighting means.

17. An apparatus of the class described having a counter-weighted bucket, a trolley, counter-weighting means for the trolley, controlling means acting in conjunction with the counter-weighting means to cause the trolley to run in either direction and common motive means for the bucket and the trolley counterweighting means.

18. A hoisting apparatus having a hoisting device, a trolley sustaining the same, a trolley-traversing drum, a counter-weight connected to turn the same, a brake for controlling said drum, and a power-actuated device for controlling said brake.

19. A hoisting apparatus having a hoisting device, a trolley sustaining the same, a trolley-traversing drum, a brake controlling the same, a pressure cylinder having its piston connected to control the brake, a valve for admitting pressure to said cylinder, a controlling device for opening or closing said valve, and means whereby said valve is automatically closed when the piston and brake have moved to a position corresponding to the changed position of the controlling device.

20. A hoisting apparatus having a trolley, a hoisting element, such as a bucket or the like, operating ropes connected to said bucket and to suitable rope-winding drums, clutch levers for controlling the operation of said rope-winding drums, a trolley traversing drum, a brake controlling the same, a power actuated device for controlling said brake, and a hand grip lever mounted upon one of said clutch levers for controlling the brake through said power actuated device.

21. A hoisting apparatus having a trolley, a bucket, an operating rope leading to the bucket, a traversing rope leading to the trolley, means for controlling the operating rope, and means permitting the operator to control said traversing rope and said operating rope with a single hand.

22. A hoisting apparatus having a trolley, a hoisting element, such as a bucket or the like, sustained thereon, an operating rope leading to the bucket, a traversing rope leading to the trolley, a lever for controlling one of said ropes, and a pivoted hand grip for controlling the other one thereof.

23. A hoisting apparatus having a trolley, a traversing rope, a hoisting rope, the pull of which is adapted to draw the trolley in one direction against the pull of the traversing rope, a rope-winding drum for the traversing rope, a counter-weight connected to turn said rope-winding drum, a brake for controlling said drum, a controlling device for the hoisting rope, and an auxiliary controlling means on said controlling device.

24. In a hoisting apparatus the combination with a trolley of a grab or bucket, a hoisting rope and an opening and closing rope for the bucket, a rope winding drum for each rope, a friction device for each drum, a pair of bucket controlling levers to control each a friction device, an auxiliary hand lever pivotally mounted upon one of the bucket levers and within the grasp of the hand holding the bucket lever, said bucket lever and auxiliary hand lever having each a working movement independent of the working movement of the other and means to control the trolley through the independent movement of the auxiliary hand lever.

25. A hoisting apparatus having a tower, a plurality of operating ropes, a hand lever controlling the hauling in or letting out of one of said ropes, and a pivoted grip lever mounted on the hand lever controlling the hauling in or letting out of the other of said ropes.

26. In an apparatus of the class described, having a counter-weighted trolley, a counter-weighted bucket, operating ropes for the bucket, rope-winding drums for winding on or unwinding said ropes, said drums being adapted to be driven at the same speed, and planetary gearing means for reversing the rotation of one of said drums to relieve the bucket of the counter-weighting effect at the appropriate time.

27. A hoisting apparatus having a hoisting device, a trolley sustaining the same, a trolley traversing drum, a brake controlling the same, pressure fluid means controlling the brake, controlling means for said pressure fluid means, and means to move said brake and said pressure fluid means to a variable extent determined by the variable movement of the controlling means.

28. A hoisting apparatus having a hoisting device, a trolley sustaining the same, a trolley traversing drum, a traversing rope, a controlling device for controlling the movement of the trolley drum, power-actuated means therefor and controlling means for said power-actuated means, the said controlling device being adapted to have a movement through said power-actuated means proportionate to the movement of the controlling means.

29. A hoisting apparatus having a trolley, a traversing rope, a rope-winding drum therefor, a counter-weight connected to turn said rope-winding drum, a brake for controlling said drum, a hoisting rope, a movable controlling device for the hoisting rope, and auxiliary controlling means on said controlling device for controlling the brake.

30. A hoisting device having a trolley, a bucket, an operating rope for the bucket, a traversing rope for the trolley, a hand lever for controlling one of said ropes, a separate auxiliary device movably mounted upon said lever and within the grasp of the hand holding said lever, said auxiliary device and lever having each a working movement independent of the working movement of the other, and means for controlling the remaining rope through the independent movement of said auxiliary controlling device.

31. In a hoisting apparatus the combination with a trolley, of a grab or bucket, a hoisting rope and an opening and closing rope for the bucket, a rope winding drum for each rope, a friction device for each drum, a pair of bucket controlling levers to control each a friction device, a separate auxiliary grasping device movably mounted upon one of the bucket levers and within the grasp of the hand holding the bucket lever, said auxiliary device and hand lever having each a working movement independent of the working movement of the other, and means to control the trolley through the independent movement of the auxiliary grasping device.

32. A hoisting apparatus having a plurality of operating ropes, a hand lever controlling the hauling in or letting out of one of said ropes, and auxiliary controlling means associated with said hand lever and adapted to be actuated by the hand of the operator, while still grasping and holding said lever, for controlling the hauling in or letting out of the other of said ropes.

33. A hoisting apparatus having a trolley, a bucket, a pair of hand-operated devices for controlling the bucket, and auxiliary controlling means associated with said hand-operated devices and adapted to be actuated by the hand of the operator, while still maintaining his hold upon the hand-operated devices.

34. A hoisting apparatus having a bucket, a trolley, a pair of hand-operated levers for the bucket, and auxiliary means adapted to be controlled by the same operator, while still maintaining his hold upon the bucket operating levers for controlling the traverse of the trolley.

35. A hoisting apparatus having a trolley, a hoisting element such as a bucket sustained thereby, one or more operating ropes leading from the bucket to the trolley and thence to suitable hoisting apparatus but exerting a pull upon the trolley in one direction, a traversing rope connected to pull the trolley in the opposite direction, a rope-winding drum connected to control said traversing rope, a brake connected to hold or release said rope-winding drum, an operating lever for holding said brake applied, and pressure operated means for controlling the brake.

36. A hoisting apparatus having a trolley, a hoisting element such as a bucket or the like sustained thereby, an operating rope leading to the bucket, a traversing rope leading to the trolley, a lever for controlling one of said ropes and auxiliary controlling means upon said lever for controlling the other of said ropes.

37. A hoisting apparatus having a trolley, a traversing rope, a rope-winding drum therefor, means to turn said rope-winding drum, a brake for controlling said drum, a controlling lever and a pivoted hand grip on the controlling lever for controlling the brake.

38. In a hoisting apparatus the combination with a trolley, of a grab carried thereby, an operating rope therefor, a rope-winding drum, a hand-controlled lever therefor, a hand grip upon said lever, a member in alinement with the axis of said hand lever and connected to be moved by movement of said hand grip, a pressure-controlled device, and means for admitting pressure to said device on movement of said member.

39. A hoisting apparatus having a trolley, a grab carried thereby, a hoisting rope therefor, a hoisting drum, a clutch-operating lever for said hoisting drum, a traversing rope, a traversing drum for the trolley and a hand grip lever upon said clutch lever for controlling said traversing drum irrespective of the position of said clutch lever.

40. A hoisting apparatus having a trolley, a hoisting device such as a grab or bucket sustained thereby, means for operating the bucket, means for traversing the trolley, and means permitting the same operator simultaneously to control the traversing means and bucket operating means.

41. A hoisting apparatus having a hoisting device, means for counter-weighting the same, means for positively raising said hoisting device, means for positively relieving the same of the counter-weighting effect, and a single controlling device for throwing into effect either of said means.

42. A hoisting apparatus having a hoisting device, means for counter-weighting the same, a rope-winding drum connected to said hoisting device and said counter-weighting means, drum driving means, reversing means, and a controlling device adapted in one position to clutch said drum to the driving means, in another position to said reversing means, and in a third position to leave said drum free to turn.

43. A hoisting apparatus having a hoisting device, means for counter-weighting the same, means for positively raising said hoisting device, means for positively relieving the same of the counter-weighting effect, and means providing for the inoperativeness of one of said means while the other is in operation.

44. In a hoisting apparatus, the combination with a traversing carriage, of a hoisting device supported thereby, a controlling device for said hoisting device within the control of the operator, a driving motor for said traversing carriage, pressure fluid means for controlling the motor-actuated travel of said carriage, and means for controlling said pressure fluid actuated means, said controlling means being located upon said first-named controlling device.

45. In a hoisting apparatus the combination with a hoisting device, a controlling lever therefor, an auxiliary controlling device for said hoisting device, a controlling member mounted upon said controlling lever for controlling said auxiliary device, connections between said device and said member comprising a movable member mounted coaxially with said controlling lever, connections for imparting movement thereto leading to said controlling member and connections between said movable member and said auxiliary device to cause controlling movement of the latter.

46. In a hoisting apparatus the combination with a hoisting device, a controlling lever therefor, a hand grip upon said lever, a rod axially alined with said lever, means connecting said rod with said hand grip and controlling means for said hoisting device connected with said rod and thereby to be controlled through movement of said hand grip.

47. In a hoisting apparatus the combination with a hoisting device, a controlling lever therefor, an auxiliary controlling device for said hoisting device, a controlling member mounted upon said controlling lever for controlling said auxiliary device, connections between said device and said member comprising a movable member mounted coaxially with said controlling lever, a bell-crank lever for moving the same connected to said controlling member and a second bell-crank lever adapted to be moved thereby connected to said auxiliary device.

48. In a hoisting apparatus the combination with a trolley, a trolley drum and trolley drum motor, of a grab or bucket, a hoisting rope, and an opening and closing rope for the bucket, a rope winding drum for each rope, a friction device for each drum, a pair of bucket controlling levers directly and mechanically connected to control each a friction device, an auxiliary grasping device movably mounted upon one of the bucket levers and within the grasp of the hand holding the bucket lever, said auxiliary device and bucket lever having each a working movement independent of the working movement of the other, and means to control the trolley through the independent movement of the auxiliary grasping device.

49. In a hoisting apparatus the combination with a trolley, of a bucket, a hoisting rope and an opening and closing rope for the bucket, a rope winding drum for each rope, a friction device for each drum, a pair of bucket controlling levers to control each a friction device, an auxiliary controlling device movably mounted upon one of the bucket levers and within the grasp of the hand holding the bucket lever, said auxiliary device and bucket lever having each a working movement independent of the working movement of the other, and means to control the trolley through the independent movement of the auxiliary controlling device, said means comprising a friction device for the trolley drum, a fluid motor for controlling the friction device, a valve for the fluid motor, and connections between the valve and auxiliary controlling device.

50. In a hoisting apparatus the combination with a trolley, of a bucket, a hoisting rope and an opening and closing rope for the bucket, a rope winding drum for each rope, a friction device for each drum, a pair of bucket controlling levers to control each a friction device, an auxiliary controlling device movably mounted upon one of the bucket levers and within the grasp of the hand holding the bucket lever, said auxiliary device and bucket lever having each a working movement independent of the working movement of the other, and means to control the trolley through the independent movement of the auxiliary controlling device, said means comprising a friction device, a fluid motor for controlling the friction device, and a controlling valve actuated by said auxiliary controlling device for varying the extent of application of said trolley drum friction device.

In testimony whereof, I have signed my name to this specification, in the presence of two subscribing witnesses.

ALMON E. NORRIS.

Witnesses:
THOMAS B. BOOTH,
ANNIE E. CHESLEY.